US009786259B2

(12) United States Patent
Siciliano

(10) Patent No.: US 9,786,259 B2
(45) Date of Patent: Oct. 10, 2017

(54) DJ STEM SYSTEMS AND METHODS

(71) Applicant: Beatport, LLC, Denver, CO (US)

(72) Inventor: Michael Peter Siciliano, Denver, CO (US)

(73) Assignee: Beatport LLC, Denver, CO (US)

(*) Notice: Subject to any disclaimer, the term of this patent is extended or adjusted under 35 U.S.C. 154(b) by 0 days.

(21) Appl. No.: 15/207,157

(22) Filed: Jul. 11, 2016

(65) Prior Publication Data

US 2016/0322039 A1 Nov. 3, 2016

Related U.S. Application Data

(62) Division of application No. 13/802,548, filed on Mar. 13, 2013, now Pat. No. 9,398,390.

(51) Int. Cl.
*G10H 1/00* (2006.01)
*H04S 1/00* (2006.01)
(Continued)

(52) U.S. Cl.
CPC ......... *G10H 1/0008* (2013.01); *G11B 27/005* (2013.01); *G11B 27/036* (2013.01); *G11B 27/038* (2013.01); *G11B 27/105* (2013.01); *G11B 27/32* (2013.01); *H04H 60/04* (2013.01); *H04S 1/00* (2013.01); *H04S 1/007* (2013.01); *H04S 7/00* (2013.01); *G10H 2210/061* (2013.01); *G10H 2210/125* (2013.01);
(Continued)

(58) Field of Classification Search
CPC ............. G10H 1/008; G10H 2210/061; G10H 2210/125; G10H 2210/131; G10H 2210/295; G11B 27/005; G11B 27/036; G11B 27/038; G11B 27/105; G11B 27/32; H04S 1/00; H04S 1/007; H04S 7/00; H04R 29/008; H04H 60/04
USPC ....................................... 381/119, 2; 700/94
See application file for complete search history.

(56) References Cited

U.S. PATENT DOCUMENTS 7,592,534 B2 9/2009 Yoshikawa et al.
2008/0249644 A1 10/2008 Jehan
(Continued)

OTHER PUBLICATIONS

Valentino, "Ableton Live 9 Tutorial—Mixing two tracks together", Mar. 6, 2013, Video length 14:44 minutes; https://www.youtube.com/watch?v=A3AYQj0LIKA.*
(Continued)

*Primary Examiner* — David Ton
(74) *Attorney, Agent, or Firm* — Lathrop & Gage LLP

(57) ABSTRACT

Systems and methods selectively mix a first and second song together during a live performance. The first song has a plurality of first stems, each having stereo audio that combine to form the audio of the first song. The second song has a plurality of second stems, each having stereo audio that combine to form the audio of the second song. A computer, with memory and a processor, executes machine readable instructions of a multiple channel audio mixing application with stored within the memory. The multiple channel audio mixing application plays and mixes audio of at least one of the first stems with audio of at least one of the second stems. The multiple channel audio mixing application is controlled in real-time during the performance to select the at least one first stem and the at least one second stem for the mixing.

12 Claims, 11 Drawing Sheets

(51) Int. Cl.
  *G11B 27/036* (2006.01)
  *G11B 27/038* (2006.01)
  *G11B 27/00* (2006.01)
  *G11B 27/10* (2006.01)
  *G11B 27/32* (2006.01)
  *H04H 60/04* (2008.01)
  *H04S 7/00* (2006.01)
  *H04R 29/00* (2006.01)

(52) U.S. Cl.
  CPC . *G10H 2210/131* (2013.01); *G10H 2210/295* (2013.01); *H04R 29/008* (2013.01)

(56) References Cited

U.S. PATENT DOCUMENTS

| | | |
|---|---|---|
| 2008/0282870 A1 | 11/2008 | Carrick et al. |
| 2008/0314232 A1 | 12/2008 | Hansson et al. |
| 2010/0036759 A1 | 2/2010 | Ben-Yaacov et al. |
| 2010/0132536 A1* | 6/2010 | O'Dwyer ............. G10H 1/0008 84/609 |
| 2010/0216547 A1 | 8/2010 | Coppard et al. |
| 2011/0218983 A1 | 9/2011 | Chaney et al. |
| 2011/0231426 A1 | 9/2011 | Fejta et al. |
| 2012/0308049 A1 | 12/2012 | Schreiner et al. |
| 2013/0266155 A1* | 10/2013 | Mashita .................... H04R 3/00 381/119 |
| 2014/0018947 A1 | 1/2014 | Ales |
| 2014/0180762 A1 | 6/2014 | Gilbert |

OTHER PUBLICATIONS

Lippok, "Robert Lippok on Ableton Live 9"; Dec. 10, 2012; Video length 4:11; https://www.youtube.com/watch?v=ukQXMfJ-tRc.*
PCT/US2013/031756 International Search Report & Written Opinion mailed Dec. 13, 2013, 19 pages.

* cited by examiner

DJ STEM SYSTEMS AND METHODS

RELATED APPLICATIONS

This application is a divisional of pending U.S. patent application Ser. No. 13/802,548, filed Mar. 13, 2013 and which is incorporated by reference herewith in its entirety.

BACKGROUND

Multi-track mixing has been used within recording studios for many years. Originally, two or more tape recorders each stored one musical track of sounds (e.g., voice, guitar, drums) that were combined together to form a musical recording (e.g., a song, orchestral piece, or sound track) when the plurality of tracks were played back simultaneously. Typically, these tracks are played into a mixing device where the volume (and other characteristics) of each track is controlled (e.g., faded in and out) to produce the audio title (hereinafter 'song') as two stereo audio tracks that are recorded onto another tape recorder in preparation for mass productions of vinyl records, CDs and other formats. The tape recorders and mixing devices were originally analog (i.e., handling analog audio signals) and later developed into digital devices that handle audio in a digital format (e.g., pulse-width modulation (PWM), MP3 and other digital audio format files). The resulting song is a stereo audio format that is generated from the original recorded tracks. Songs purchased by consumers are typically produced in this way, such that the consumer purchases only the mixed stereo audio. For example, CDs and MP3 files are composed of only two premixed stereo audio channels that are played simultaneously.

Although prior art multi-track recorders allows individual tracks to be mixed together, these tracks were used much like the way loops and samples are used within modern audio workstations. There is no automatic synchronization of the tracks; each track must be started at the right time by the operator. Starting and stopping of each track at the correct time is very difficult and prone to error, and is not something that can be done in real-time during a performance.

To play music at a venue, a disk-jockey (DJ) operates a DJ console to select and play songs. The songs may be played from a media (e.g., CD or flash drive) or selected from a digital library, stored on a computer for example. The DJ often plays and mixes two songs together, for example when transitioning from a first song to a second song such that the performance is continuous. The DJ may also selectively mix high, medium, and low frequency components of two songs together, to form a stereo audio output (called a "mix") that is heard by the audience. The mix may also be recorded and sold as a "performance" by the DJ.

FIG. 1 is a schematic showing a prior art DJ console 102 that is used to create a mix 104 from five songs 106(1)-(5). Console 102 has two decks 110(1) and 110(2), each with a mixing control set 112(1) and 112(2), respectively. Decks 110 are for example CD players and/or shuttle/nudge controls for other digitally stored audio sources. Using the mixing controls 112, the DJ selects an amount of high, mid, and low frequency range signal from the audio of each deck 110 for mixing together. The DJ uses the shuttle/nudge controls for each deck to ensure that the beats within each audio source are synchronized before mixing.

In the example of FIG. 1, during a performance to create mix 104, the DJ first mounts song 106(1) on deck 110(1), adjusting mixing control set 112(2) to output no sound from deck 110(2), and adjusting mining control set 112(1) to output audio from deck 110(1). The DJ mounts song 106(2) on deck 110(2), synchronizes the beat from deck 110(2) with the beat from deck 110(1), and at the appropriate time mixes audio from song 106(2) with the audio of song 106(1) using audio mixing control set 112(2) (and optionally audio mixing control set 112(1)). Once song 106(1) has been faded out, the DJ replaces song 106(1) with song 106(3) on deck 110(1). The DJ then synchronizes the beat of song 106(3) with that of song 106(2), and at the appropriate time, uses mixing control set 112(1) to mix song 106(3) with song 106(2). Once song 106(2) has been mixed out, the DJ replaces song 106(2) with song 106(4) on deck 110(2). The DJ then synchronizes the beat of song 106(4) with that of song 106(3), and at the appropriate time, uses mixing control set 112(2) to mix song 106(4) with song 106(3). This process repeats to mix in and switch to each song 106.

The songs that are available to DJs are stereo (i.e., two channel) formed by mixing individual sounds from multiple tracks together. Although the DJ attempts to select certain sounds from each song for mixing, this is limited to the frequency/bandwidth based selection provided by audio mixing control sets 112.

SUMMARY OF THE INVENTION

Rather than store each song as conventional stereo audio (i.e., two audio tracks that combine to form the song), each song is stored as a plurality of stems of sounds (e.g., voice, guitar, drums) that are played together to form the song. Each stem has stereo audio channels that combine to form the stem sounds. Each song may have a plurality of stems that created from original channels recorded during a live performance of the song. Since the plurality of individual stems is available for the song, a DJ may create a unique mix of each song by dynamically mixing audio of one or more of the plurality of stems together.

The DJ may also mix stems from multiple songs together. For example, when performing live at a venue, the DJ may mix stems from two different songs together. In one operational example, the DJ mixes a drum stem from a first song with vocal and guitar stems from a second song to generate a unique mix. The DJ may vary the stem mixing and song selection during the performance, such that the mix may initially contain the drum stem from a first song, transition to include the drum stem from a second song, and finally include a drum stem from a third song.

Since the DJ has control over mixing of each stem of each song during a performance, the DJ creates a mix that is unique to the performance.

In one embodiment, a system selectively mixes a first song and a second song together during a live performance. The first song has a plurality of first stems, each having stereo audio that combine to form the audio of the first song. The second song has a plurality of second stems, each having stereo audio that combine to form the audio of the second song. The system includes a computer with memory and a processor, and a multiple channel audio mixing application with machine readable instructions stored within the memory and executed by the processor for playing and mixing audio of at least one of the first stems with audio of at least one of the second stems. The multiple channel audio mixing application is controlled in real-time during the performance to select the at least one first stem and the at least one second stem for the mixing.

In another embodiment, a method is used by a DJ to selectively mix a first song and a second song together during a live performance. The first song has a plurality of first stems that each includes that combines to form the audio of the first song. The second song has a plurality of second stems that each include audio that combine to form the audio of the second song. The method interacts with the DJ using a DJ console that has a plurality of physical controls coupled to a computer to receive instructions during the performance. The method selects within the computer, based upon the instructions, at least one of the first stems and at least one of the second stems. The method then mixes, within the computer and based upon the instructions, the at least one first stem and the at least one second stem to generate an audio output for the live performance.

In another embodiment, a console provides a DJ with control of DJ mixing software to mix one or more stems of each of two or more songs together in real time. The console includes a housing with a faceplate and a communication port, a first set of stem controls for controlling play of a first stem of a first song by the DJ mixing software, a second set of stem controls for controlling play of a second stem of the first song by the DJ mixing software, a third set of stem controls for controlling play of a third stem of a second song by the DJ mixing software, and a fourth set of stem controls for controlling play of a fourth stem of the second song by the DJ mixing software. The DJ mixing software is controlled by the first, second, third, and fourth stem controls to mix at least one of the first stem and the second stem and at least one of the third stem and the fourth stem together in real time to generate an audio output.

In another embodiment, a system for cloud-based DJing during a live performance includes a server computer, located within the cloud and accessible via the Internet, comprising a processor and a memory for storing a plurality of songs, an account manager, implemented as machine readable instructions stored within the memory that when executed by the processor, interact with a DJ computer via the Internet to identify a first and a second song, and a stream buffer for receiving the first and second songs from the memory and for streaming the first and second songs to the DJ computer. The DJ computer mixes the first and second songs during the live performance.

In another embodiment, a method is used to DJ from the cloud by interacting with a DJ computer via the Internet to identify a first and a second song, retrieves the first and second songs from a library of songs, and streams the first and second song, via the Internet, to the DJ computer. The DJ computer mixes at least part of the first song and at least part of the second song together to generate sounds for a live performance.

In another embodiment, a system automatically updates metadata for a song. The system includes a computer server with a processor, non-transitory memory, and an interface to the Internet. A song library is stored within the memory and contains the song and metadata associated with the song. A metadata manager has machine readable instructions stored within the memory and executed by the processor to automatically update metadata for the song by (a) receiving amended metadata for the song from each of a plurality of DJ libraries remotely stored from the computer server, (b) collectively processing the amended metadata to algorithmically determine a trend in the amendments, and (c) applying the amendments to the metadata associated with the song within the song library based upon the trend.

In another embodiment, a method is used to automatically update metadata of a song stored in a song library of a computer server. Amended metadata for the song is received within the computer server from each of a plurality of remote DJ libraries that are each maintained by a different DJ. The amended metadata is collectively processed to determine a trend in the amendments based upon statistical analysis, and the amendments are applied to the metadata of the song within the song library based upon the trend.

In another embodiment, a method is used to automatically manage and organizes songs. A purchase of a song is detecting on a computer of a DJ. Information of the purchase and of the song is automatically added to a purchased playlist of the computer. A DJ application running on the computer detects when the DJ plays at least a part of the song during a performance at a venue, and automatically adds information of the song to a venue played playlist stored on the computer. The venue played playlist is associated with the venue.

In another embodiment, a method is used to automatically manage and organizes songs. Purchase information based upon a purchased playlist stored on a remote computer of a DJ is received within a computer server. The purchased playlist is automatically generated on the remote computer when a song is purchased. Venue information based upon a venue played playlist stored on the remote computer is received within the computer server. The venue played playlist is automatically generated within the remote computer when the DJ plays at least part of the song at a venue. Statistical information indicative of song popularity is determined within the server computer from the purchase information and the venue played playlist.

DETAILED DESCRIPTION

Definition of Terms

Within the music industry, terminology is continually evolving and changing as technology advances. Throughout this application, the following terms and their meanings are used.

| | |
|---|---|
| Audio file | There are several types of audio file. In a WAV file, the audio is encoded using pulse code modulation (PCM) and is a "raw" data file with no compression. An AIF files is similar to the WAV file (i.e., uses PCM) but also includes a block of metadata that is added to the end of the file and which contains ID3 tags. The format and content of the ID3 tags in the metadata is defined by an ID3 committee. Devices that do not understand or use the ID3 tags ignore this metadata block. MP3 audio files contain stereo auction channels that are encoded using PCM and then compressed to reduce the file size. Other types of audio file also exist. In the following description, the term audio file is used to mean any of the above file types unless otherwise described. |
| Mix | This is a mix of songs - for example as created by a DJ when performing at a venue. The mix includes multiple songs that are mixed together. Sometimes, the portion of a song used in the mix is small - i.e., not always the entire song is included in a mix. |
| Song | A song is an "audio performance" that is stored in an audio file. The song may comprise stereo audio streams that are simultaneously played back together to reproduce the audio of the song (e.g., songs found on CDs). The song may also include a plurality of stems that are each formed of stereo audio streams; the stems may be played back simultaneously to form the song. |
| Stem | A song may include one or more stems, each of which is the same length (duration) as the song but contains one particular feature/instrument of the song. A stem is analogous to prior art tracks, but are managed and controlled in a novel way. When all of the stems of the song are simultaneously played and mixed together, the complete audio of the song is reconstructed. Typically, a song will have six stems, although a song may have more of fewer stems without departing from the scope hereof. |
| Part | A "part" refers to a portion of a song. For example, if a song has a duration of 2 minutes, a 30 second portion of that song starting 45 seconds from the beginning represents a "part" of the song. A part typically identifies the same portion of time within each stem of the song. |
| Sample | A sample is a recorded sound. E.g., one drum hit, one note of a piano. |
| Loop | A loop is a sequence of samples. E.g., a drum sequence, a riff (short repeated musical phrase). The loop may be configured to repeat continuously until stopped. |

Figure 1:
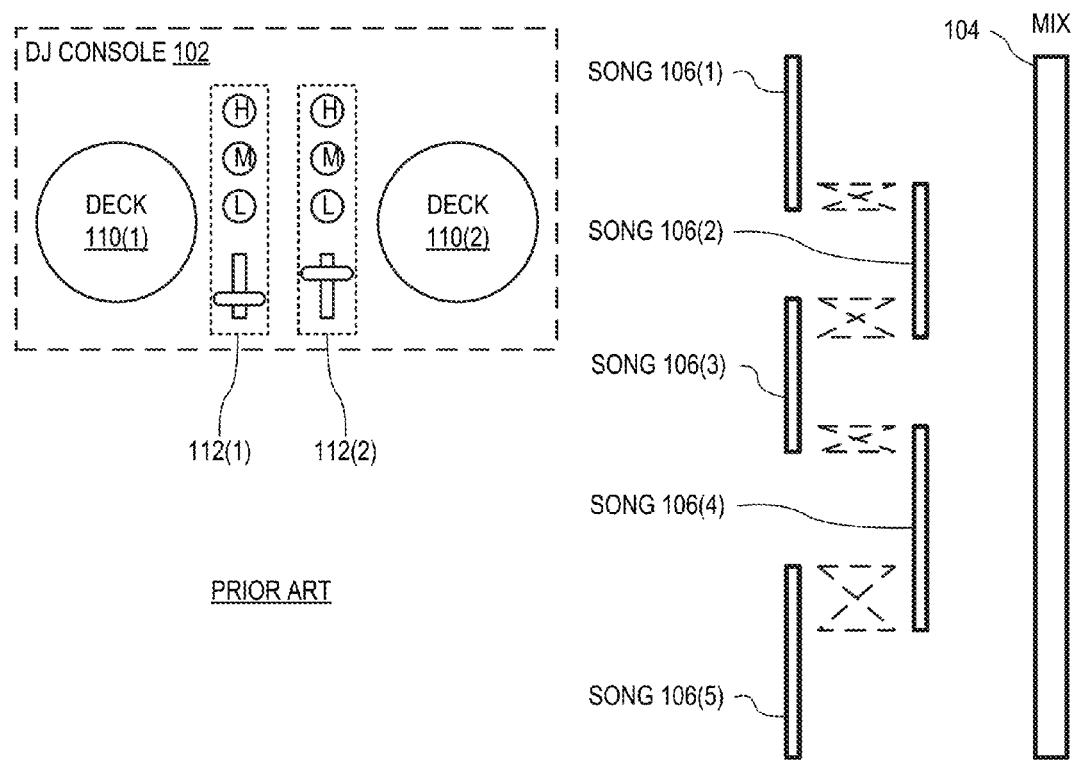
FIG. 1 is a schematic showing a prior art DJ console used to create a mix from five songs.
Figure 2:
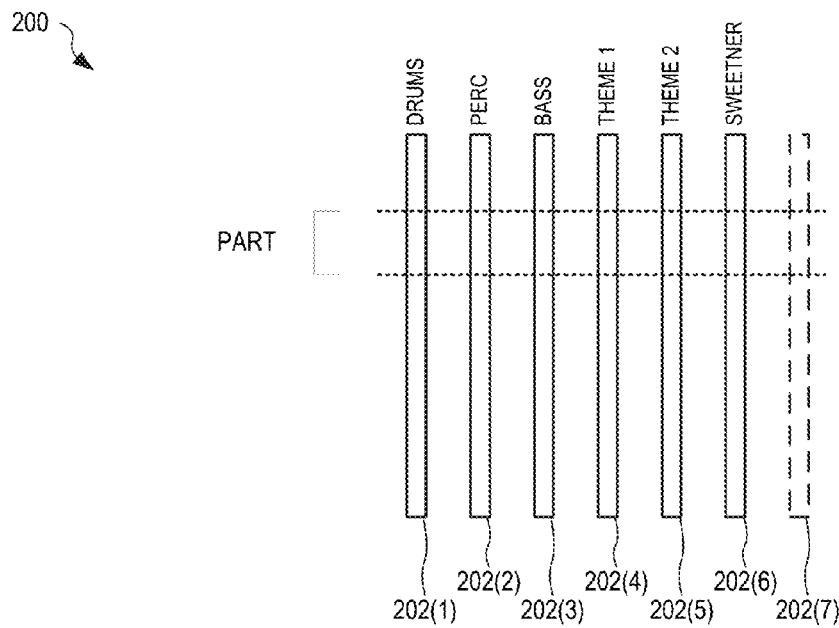
FIG. 2 shows one exemplary song formed as a plurality of stems.

FIG. 2 shows one exemplary song 200 formed of a plurality of stems 202, each of which has two channels that store, in combination, stereo audio. In one embodiment, each stem 202 is an audio file (e.g., a .WAV or .MP3 file) having stereo channels. In one example, where the duration of song 200 is D, stored as a conventional audio file with stereo audio channels, X MB of storage is required. Where six stems 202 are also provided with song 200, as shown in FIG. 2, the amount of additional storage required is 6 times X because each stem 202 is stored as an audio file (stereo channels) and is the full duration of song 200. For example, if song 200 is 3 minutes in length and the size of a 3 minute stereo audio file is 40 Mbytes, then each stem 202 of song 200 is also 3 minutes in duration, requiring 40 Mbytes of storage per stem 202.

Each stem 202 may include metadata defining parameters and characteristics of that stem. For example, metadata within each stem 202 may include additional ID3 tags that define the type of sound contained within stem (e.g., drums, percussion, bass, theme 1, theme 2, and sweetener) as well as the name, beats per minute (BPM) and other characteristics of song 200 of which it is a portion. Although shown with six stems, song 200 may have more or fewer stems 202 without departing from the scope hereof. Six stems are believed optimal for control by a DJ performing live (in real-time) at a live venue. Song 200 may also include an audio file of the stems mixed together (e.g., the original song).

New Stem DJing (Mixing with Stems)

Figure 3:
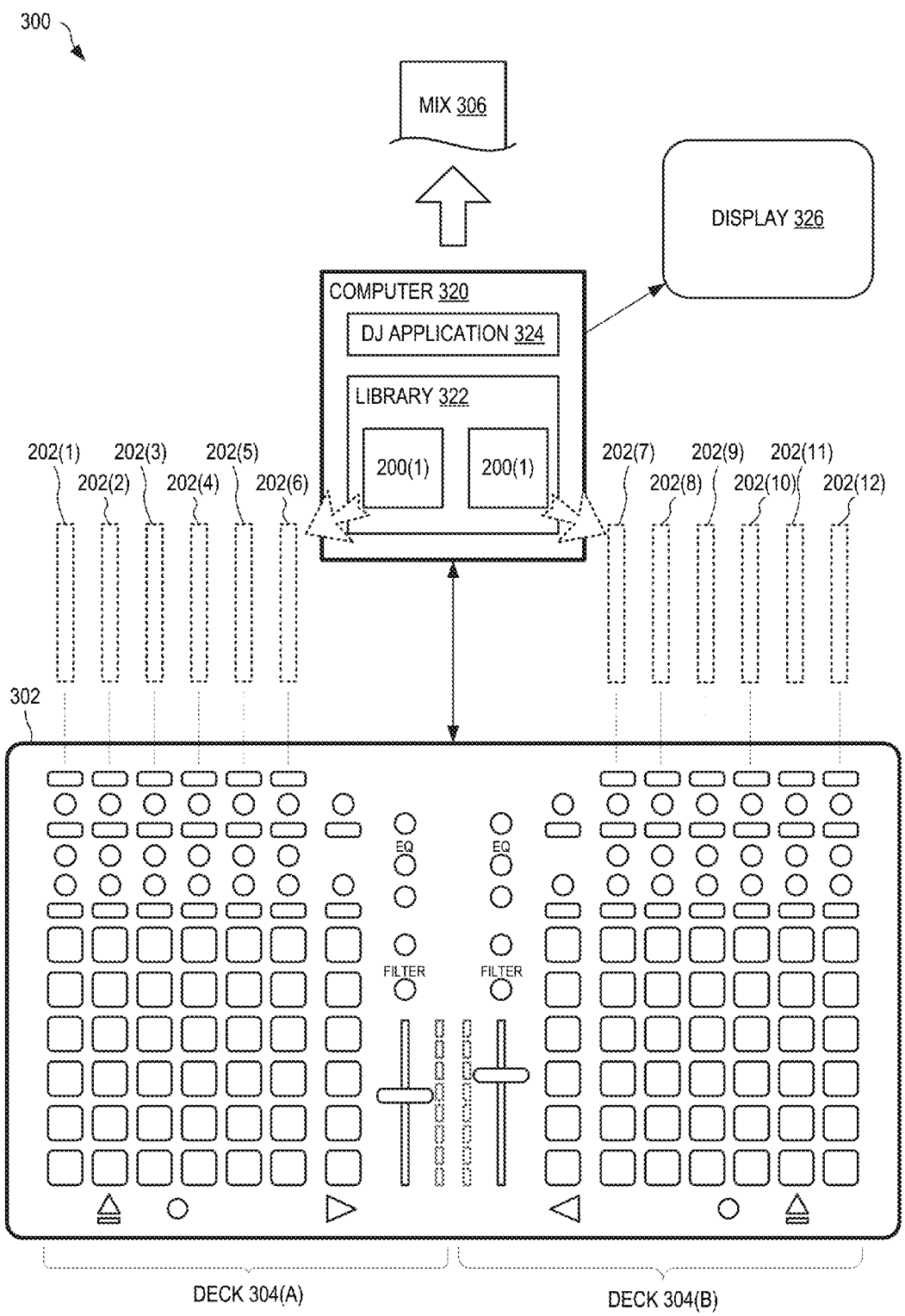
FIG. 3 shows one exemplary stem mixing console that is used by a DJ to mix stems from one or more tracks during a live performance to create an output mix, in an embodiment.
Figure 4:
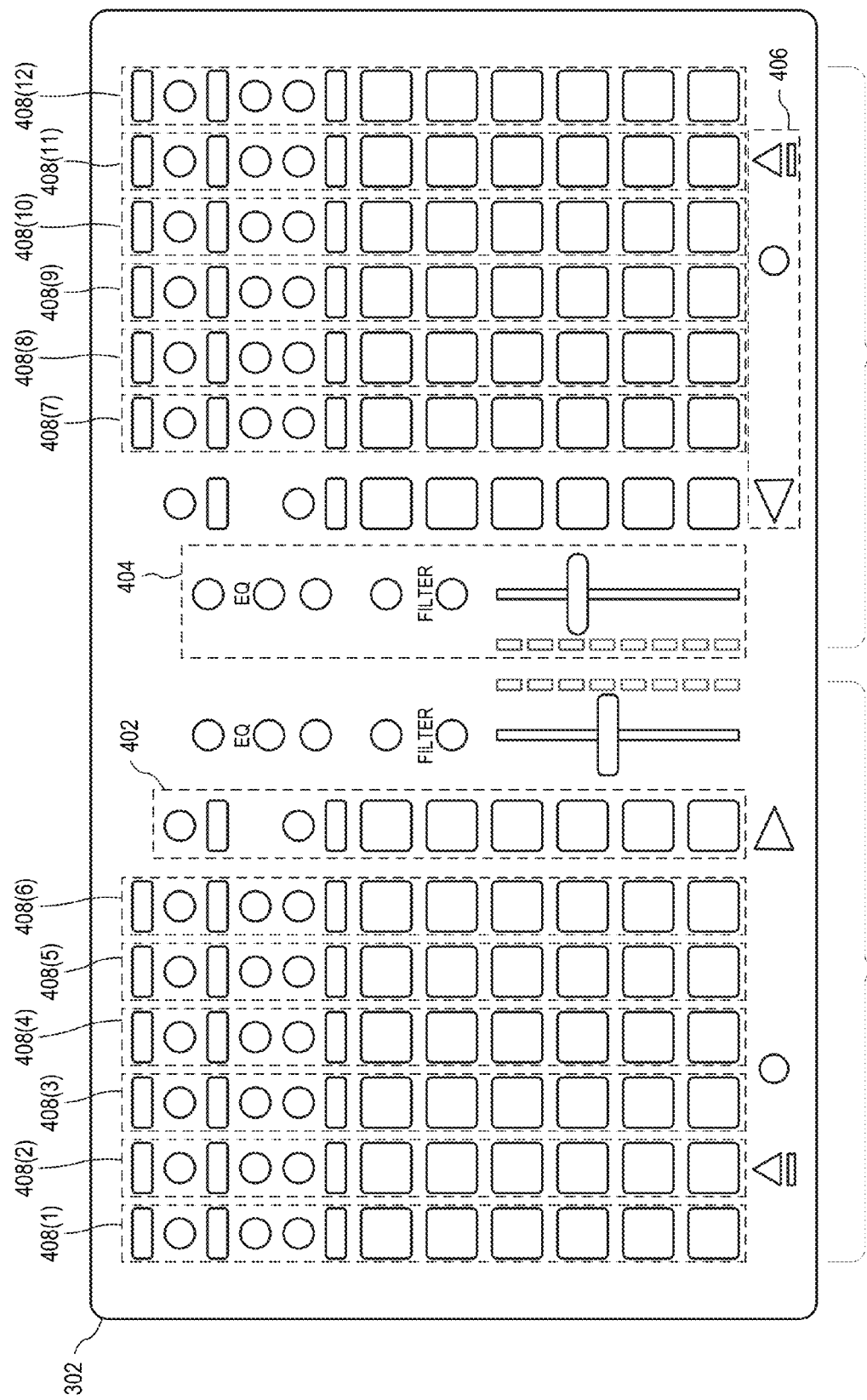
FIG. 4 shows the stem mixing console of FIG. 3 in further detail.
Figure 5:
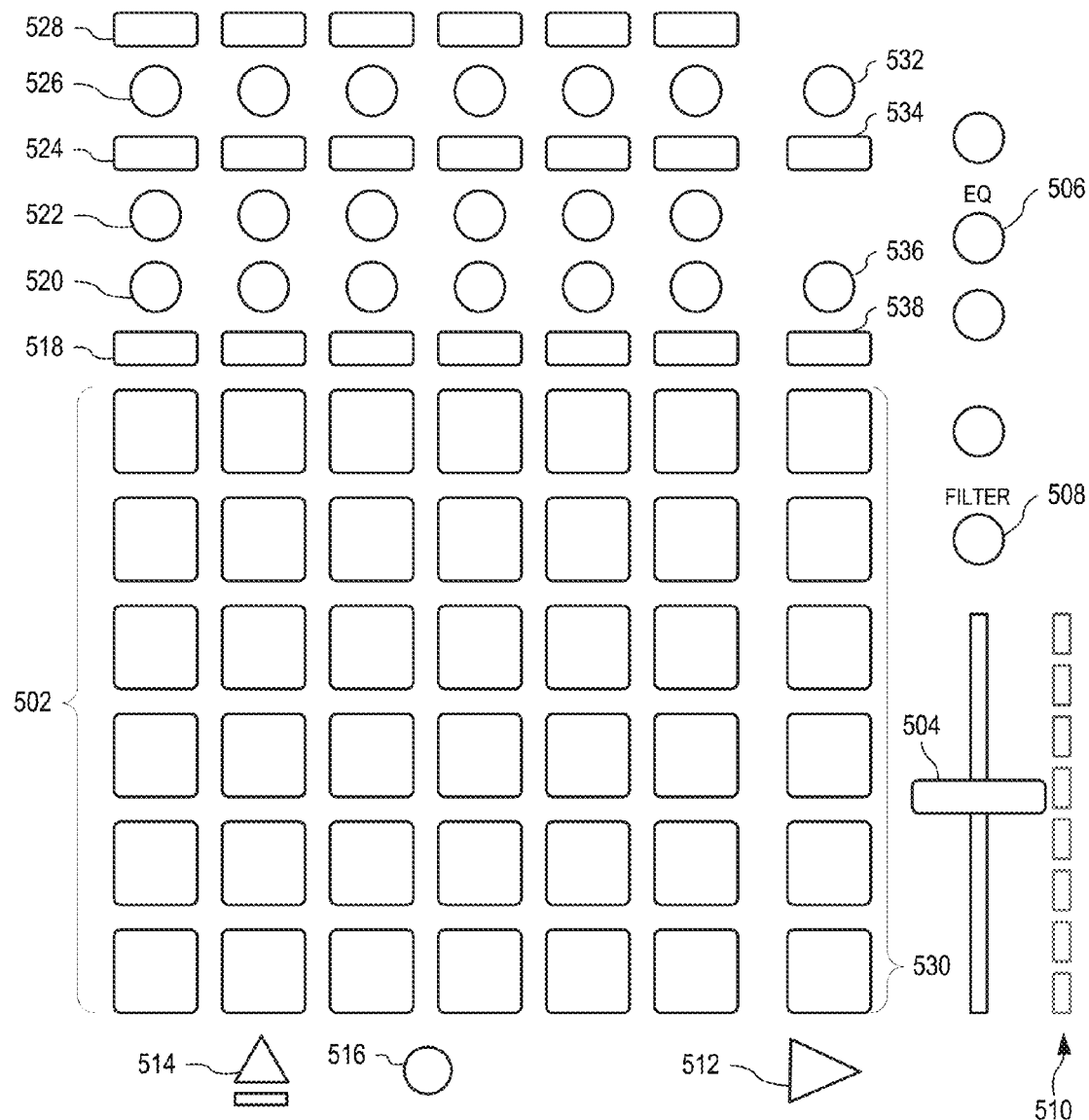
FIG. 5 shows one exemplary deck of the console of FIG. 3 in further detail.

FIG. 3 shows one exemplary stem mixing console 302 that may be used by a DJ to mix stems from one or more songs during a live performance to create output mix 306. FIG. 4 shows console 302 of FIG. 3 in further detail. FIG. 5 shows one exemplary deck of the console of FIG. 3 in further detail. FIGS. 3, 4 and 5 are best viewed together with the following description. In one embodiment, console 302 is a physical device that has a plurality of buttons, sliders and rotary controls that allows the DJ to control the mixing of stems together. In another embodiment, console 302 is implemented at least in part on a computer screen and is controlled by one or more input devices that interact with the computer. In one embodiment, the computer screen is a touch screen and the DJ's finger is the pointing device. In another embodiment, the DJ uses a mouse to control the features of console 302.

Console 302 communicatively couples with a computer 320 that stores a library 322 of songs 200 and run a DJ application 324. Computer 320 has a processor and memory that are not shown for clarity of illustration. For example, library 322 and DJ application 324 are stored within the memory. DJ application 324 has machine readable instructions that, when executed by the processor of computer 320, operates to select and mix stems 202 of songs 200 in real-time based upon input from console 302 as manipulated by the DJ. DJ application 324 includes algorithms for applying audio effect, applying filters, mixing, and cuing stems 202 of songs 200 to generate mix 306 as directed by the DJ using console 302. In one example of operation, the DJ uses console 302 to select songs 200 from library 322 to play and mix together during a live performance.

Console 302 has two decks 304(A) and 304(B) that each have controls that allows the DJ to select and mix stems 202 of a first song 200 associated with that deck with stems of a second song 200 associated with the other deck 304. Each deck 304 has six stem control sets 408 that facilitate control and mixing of stems 202 of song 200 when associated with the deck 304. Where song 200 has more than six stems 202, the DJ may select which stems 202 of song 200 are associated with each stem control set 408.

In the example of FIG. 3, the DJ has loaded song 200(1) onto deck 304(A) and has loaded song 200(2) onto deck 304(B). Although referred to as "loading", the song is not necessarily loaded into console 302, but may be associated with the specific deck 304 within DJ application 324. FIG. 3 illustratively shows stems 202(1)-(6) of song 200(1) associated with stem control sets 408(1)-(6), respectively, of deck 304(A) and stems 202(7)-(12) of song 200(2) associated with stem control sets 408(7)-(12), respectively, of deck 304(B).

Each deck 304 also has a master stem control set 402, a master deck control set 404, and a song control set 406. Master stem control set 402 includes: a master effects controls 532 and 534 for controlling the master buss effects, a master shuttle/nudge control 536 that moves the master playhead through the song, and a set of master cuepoint controls 530 that move the playhead on all stems 202 of that deck 304 to the location of the associated global cuepoint. Master deck control set 404 includes: a master volume slider 504 for that deck, an equalizer control 506 and a filter control 508 for the deck, and a Vu meter 510 for indicating the output level of the deck. Song control set 406 includes a play/pause button 512, an eject button 514 for loading song 200 from song library 322 and for unloading a non playing song 200 from deck 304, and a song knob 516 that allows the DJ to scroll through cuepoints if song 200 is loaded on deck 304, or allows the DJ to scroll through song library 322 if no song is loaded.

Each stem control set 408 has a group of six cuepoint buttons 502, collectively arranged as a 6×6 grid of cuepoint buttons for each deck 304. Cuepoint buttons 502 allows the DJ to jump through cuepoints for each stem 202, where cuepoint buttons 502 are color coded to match selected cuepoints defined using DJ application 324. Each stem control set 408 also includes a cue on/off control 518, a shuttle/nudge control 520, a channel trim control 522, an effects on/off control 524, an effects select control 526, and a stem mute/start/stop control 528.

Cue on/off control 518 provides an on/off control for jumping to cuepoints defined within each stem 202. Shuttle/nudge control 520 allows the DJ to slip the sync for the stem 202 (relative to other stems) by rotating it slowly, move the shuttle playhead through the stem 202 by rotating it fast, and immediately move the playhead to the master playhead location by pushing it. Channel trim control 522 allows the DJ to adjust the volume of that stem 202 relative to other stems 202 by rotating it, and to reset the volume level of that stem 202 by pushing it. Effects on/off control 524 turns the selected effects for that stem 202 on and off. Effects select control 526 modifies the selected effect for that stem 202, and, when rotated while effects on/off control 524 is held down, allows the DJ to select the effect for that stem 202. Stem mute/start/stop control 528 allows the DJ to start/stop or mute that stem 202, thereby cutting the audio from that stem 202.

Figure 6:
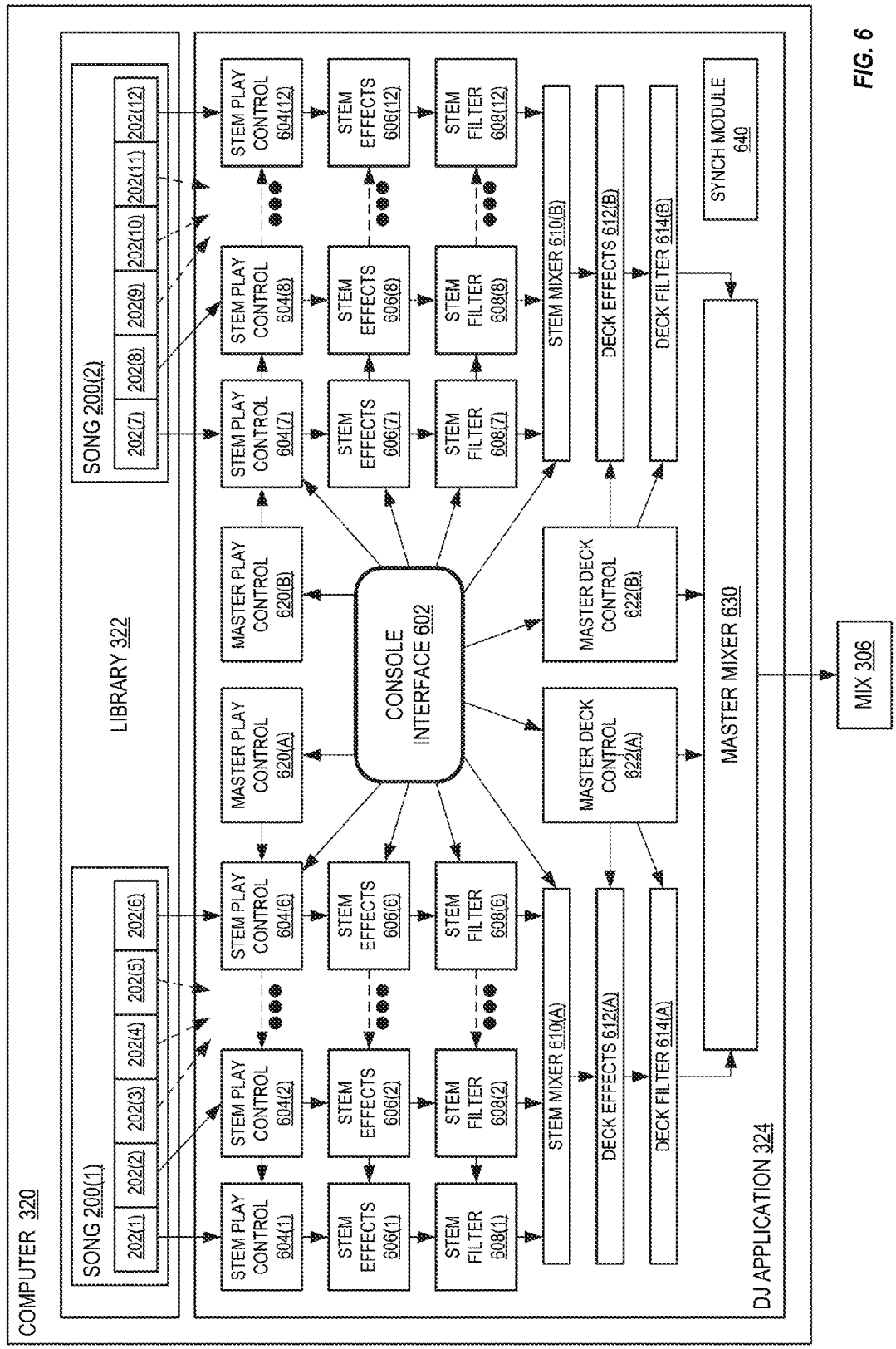
FIG. 6 is a schematic illustrating exemplary components of the DJ application of FIG. 3.
Figure 7:
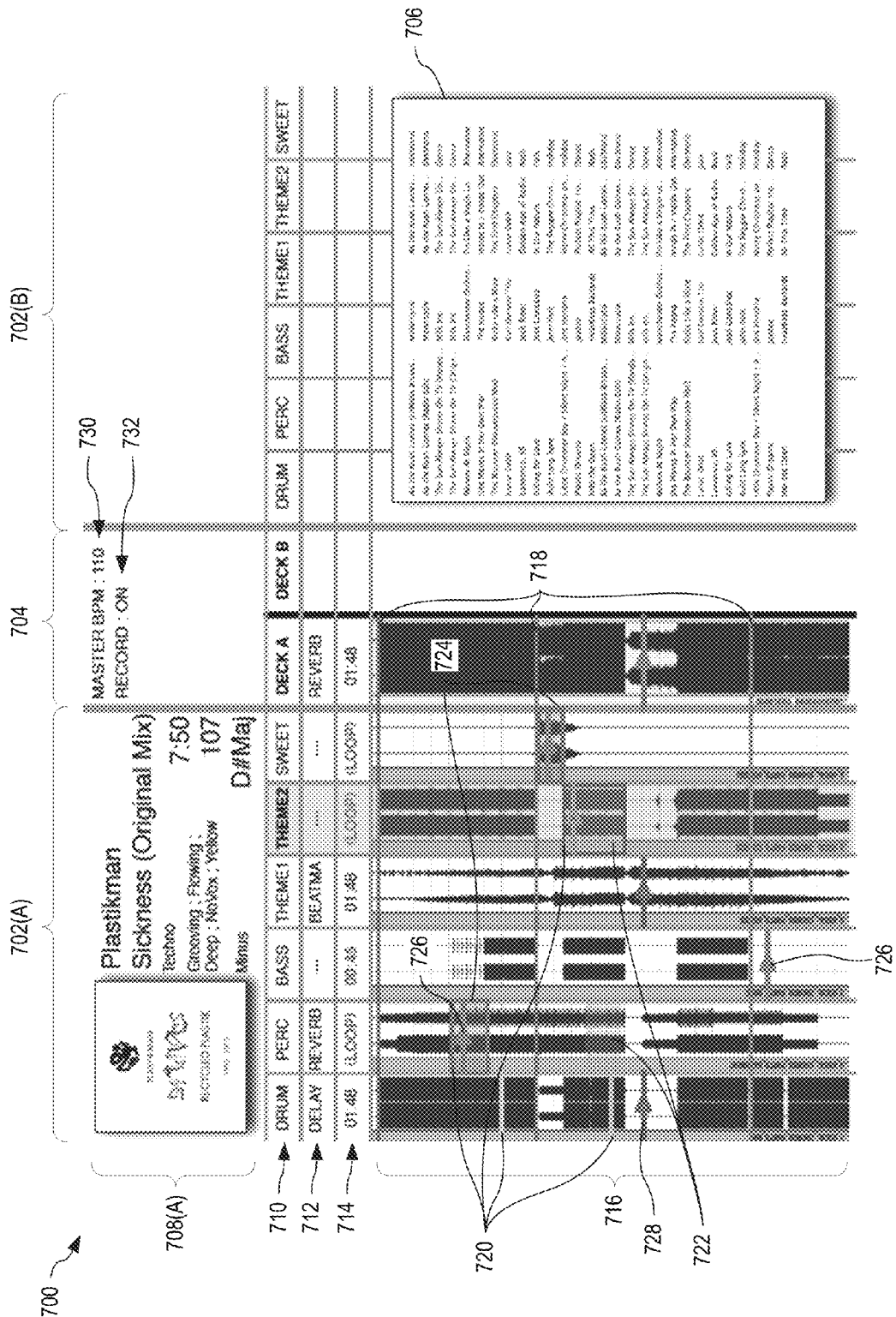
FIG. 7 shows one exemplary screenshot displayed on the display of the computer of FIG. 3 during operation of the DJ application.

FIG. 6 is a schematic illustrating exemplary components of DJ application 324. FIG. 7 shows one exemplary screenshot 700 as displayed on display 326 of computer 320 during operation of DJ application 324. FIGS. 3, 4, 5, 6, and 7 are best viewed together with the following description.

DJ application 324 includes a console interface module 602 that communicates with console 302 to allow the DJ to view status of, and control operation of, functionality of DJ application 324. During operation, DJ application 324 generates information, as exemplified by screenshot 700, for display to the DJ on display 326 of computer 320.

Display area 702(A) corresponds to operation of deck 304(A) of console 302 and functionality of stem play controls 604(1)-(6), stem effects 606(1)-(6), stem filters 608(1)-(6), stem mixer 610(A), deck effects 612(A), and deck filter 614(A) of DJ application 324. In one example of operation, the DJ uses console 302 (or optionally a pointing device of computer 320) to select song 200(1) from library 322 for play on deck 304(A), as shown in display area 702(A). Stems 202(1)-(6) of song 200(1) are automatically associated with controls 604(1)-(6), effects 606(1)-(6), and filters 608(1)-(6) within DJ application 324 and associated with stem control sets 408(1)-(6) of console 302. Display area 702(B) shows selection of a song 200 from a list 706 of songs stored within library 322, wherein the DJ uses song knob 516 of deck 304(B) to highlight (e.g. by turning) and select (e.g. by pressing) a song 200 for loading into deck 304(B) and display area 702(B) such that it may be processed by play controls 604(7)-(12), stem effects 606(7)-(12), stem filters 608(7)-(12), stem mixer 610(B), deck effects 612(B), and deck filter 614(B) of DJ application 324.

A master control display area 704 shows information relating to both decks 304, such as a master beats per minute 730 and a recording indication 732 that indicated whether the output (e.g., mix 306) is being recorded within computer 320.

Display area 702(A) shows song information 708, and, for each stem 202 of song 200, stem titles 710, selected effects 712, remain time 714, and waveform 716. As shown, each waveform 716 has stereo channels. Master cuepoints 718, indicated by a continuous, straight, colored line that crosses all waveforms 716 within the associated deck 304, are selected using master cuepoint controls 530 that are illuminated to a matching color. Stem cuepoints 720, indicated by a colored line across a waveform on one stem, are selected using cuepoint buttons 502 that are illuminated to a matching color. Loops 722 are indicated by a color shaded area that is outlined 724 when actively playing. An active playhead 726 is indicated by a green line with a green arrow and an inactive playhead 728 is indicated by a grey line with a green arrow. Loops 722, once selected, for example by selecting the associated cuepoint button 502, repeat until stopped by the DJ. The color coordination of buttons of console 302 with information of screenshot 700 facilitates operation of console 302 in real-time during a performance by the DJ.

In one example of operation, the DJ selects song 200(1) to play on deck 304(A) and selects song 200(2) for play on deck 304(B). The DJ then utilizes stem mute/start/stop controls 528 to select which stems 202 of each song 200 to mix together to form mix 306. For example, the DJ may stop drum stem 202(1) of song 200(1) and mix in drum stem 202(7) of song 200(2), having stopped other stems of song 200(2).

Using prior art DJ equipment, a DJ would spend a significant amount of effort synchronizing a first song with a second song before mixing sounds from both songs together. Using console 302 and DJ application 324, synchronization of song 200(1) and song 200(2) is performed automatically. For example, a synchronization module 640 within DJ application 324 determines, within each song 200, a sample offset (or time offset) to the first repeated beat within the song. Synchronization module 640 is for example implemented using an audio processing library of zplane.development GmbH & Co. KG that includes functionality for analyzing audio data. Once the beats per minute (BPM) and downbeat offset are determined for each song (and sample and loop) to be mixed, synchronization of the songs may be performed automatically within DJ application 324. Each stem 202 then remains synchronized with song 200 of which it is a part. That is, in the example of FIGS. 2-7, stems 202(1)-(6) remain synchronized with song 200(1). Specifically, when the DJ selects a cuepoint 720 using cuepoint buttons 502, the corresponding stem 202 starts playing in synchronization with song 200(1), thereby preventing a miss-cue. A miss-cue occurs in the prior art when a DJ starts a second song too early or too late relative to a first song, resulting in miss-matched beats when the two songs are mixed. Since DJ application 324 synchronizes stems 202 with song 200, and further synchronizes songs 200(1) and 200(2), a mistimed performance is prevented.

DJing requires that the mixing is done in real-time. That is, two or more stems from one or more songs are mixed together by the DJ, live at a venue, to generate the mix output that is played to the audience. The DJ may preselect the songs and specific stems for mixing; however, the actual mixing is performed live by the DJ. DJ application 324 may record the generated mix 306, which may include metadata that defines the songs, stems, cue points and other DJ inputs, thereby allowing mix 306 to be edited prior to publication.

DJing from the Cloud

A DJ typically brings songs (e.g., using one or more of CDs, USB drives, computer library, etc.) to a venue. The songs played (or mixed) by the DJ are thereby limited to those preselected by the DJ. If the DJ receives a request for a song that has not been brought to the venue, that request cannot be fulfilled.

Figure 8:
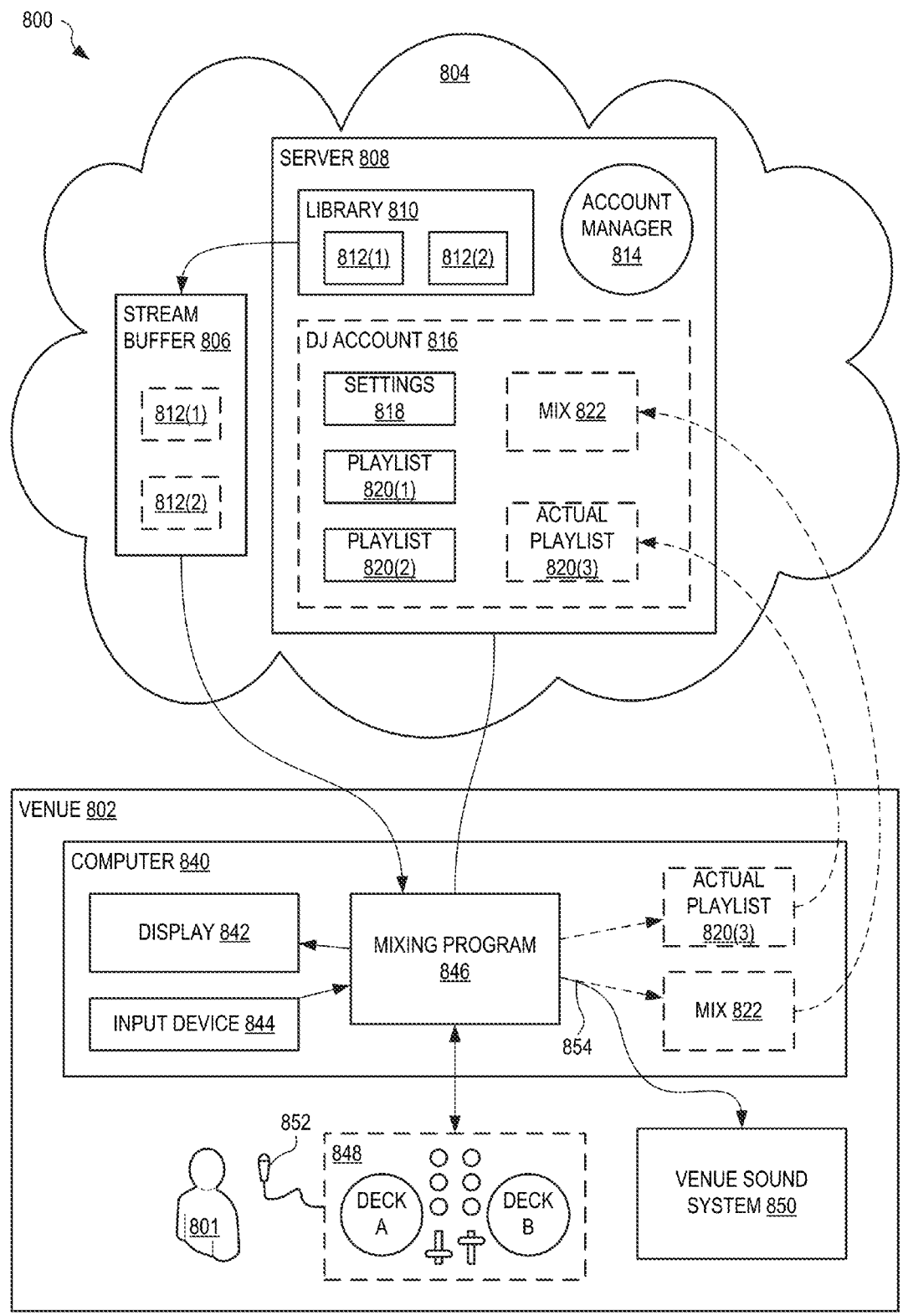
FIG. 8 shows one exemplary system that allows a DJ to perform at a venue using audio streamed to the venue from the cloud, in an embodiment.

FIG. 8 shows one exemplary system 800 that allows a DJ 801 to perform at a venue 802 using audio streamed to venue 802 from the cloud 804. System 800 includes at least one server 808 and a stream buffer 806 that are accessible within cloud 804 via the Internet for example. Cloud 804 is implemented as one or more servers that may or may not be co-located. In one embodiment, server 808 represents a plurality of geographically distributed computer servers that are interconnected through the Internet.

Server 808 include a library 810 for storing a plurality of songs 812 that are selectable for streaming to venue 802 by DJ 801. In one embodiment, songs 812 represent songs 200 of FIG. 2, where each song 802 is formed of a plurality of stems 202. In another embodiment, songs 812 represent songs with stereo audio channels.

Server 808 includes an account manager 814 that controls access to songs 812 by managing a plurality of DJ accounts 816. Server 808 is shown with one DJ account 816 for clarity of illustration. In the example of FIG. 8, DJ account 816 represents the account of DJ 801 and may include associated identification and security information such that DJ 801 is required to log-in to account manager 814 to access songs 812 and other information and data stored in association with DJ account 816.

DJ account 816 may include settings 818 that define one or more parameters and preferences of DJ 801 with regard to use of system 800, one or more playlists 820 that define a selection of songs 812, and zero, one or more mixes 822 made during a performance by DJ 801. DJ account 816 may also store an actual playlist 820(3), generated automatically by system 800, and that lists songs 812 used during a performance by DJ 801.

Library 810 and DJ account 816 may be stored within a database that is in communication with server 808. In one embodiment, the database is part of, and co-located with, server 808. In another embodiment, the database is stored remotely from, but accessible by, server 808. In one embodiment, DJ 801 pays a subscription fee to an owner of system 800 for services provided thereby, whereby account manager 814 tracks payment by DJ 801.

At venue 802, DJ 801 uses a computer 840 to login to account manager 814 of server 808 and access playlists 820 stored therein. Computer 840 may for example be provided by owners of venue 802 or may be brought by DJ 801, or provided by another party (e.g., a sponsor of the event at venue 802). Computer 840 includes a display 842, at least one input device 844, and a mixing program 846. Optionally, computer 840 is coupled with a DJ console 848 that facilitates control of mixing program 846 by DJ 801. Computer 840 is for example a personal computer such as one of a laptop computer, a tablet computer, a desktop computer, and a notebook computer.

Mixing program 846 comprises machine readable instructions that when executed by a processor of computer 840 generate an audio stream based upon input from DJ console 848, input device 844, and streamed audio from system 800. Mixing program 846 is similar to conventional DJ mixing software with the improvement that it is compatible with songs streamed from system 800. The generated audio stream is output 'live' using a sound system 850 at venue 802 and recorded as mix 822 within computer 840 and/or DJ account 816.

Stream buffer 806 is a computer or device that retrieves songs 812 identified within one or more playlists 820 selected by DJ 801. Stream buffer 806 functions to decrease latency in streaming, in real-time, songs 812 to mixing program 846 upon receiving a request for each song from mixing program 846. In one example of operation, DJ 801 interacts, using DJ console 848 and/or input device 844, with mixing program 846 to cue a portion of one or more songs (or stems) of selected playlist 820(1). Mixing program 846 requests the appropriate portion(s) of audio from stream buffer 806, and mixes the audio as controlled by DJ 801.

In one example of operation, DJ 801 arrives at venue 802, logs in to account manager 814 of server 808 using computer 840, selects playlist 820(1) and uses microphone 852, DJ console 848 and input device 844 to control mixing program 846, running on computer 840, to mix audio of songs 812 (and optionally stems 202 thereof) identified by playlist 820(1) to generate audio mix 854 for output live using sound system 850. Audio mix 854 is optionally recorded as mix 822 and actual playlist 820(3) may be created to record the songs used to generate mix 854 based upon songs 812 selected from playlist 820(1) and mixed by DJ 801. For example, DJ 801 may select songs 812 from more than one playlist (e.g., playlists 820(1) and 820(2)), wherein these selected songs are recorded within playlist 820(3).

Mixing program 846 may also belong to DJ 801, wherein stream buffer 806 operates as a network storage device to facilitate streaming of songs 812 to computer 840 as requested by mixing program 846. That is, stream buffer 806 may operate to appear to mixing program 846 as a conventional file storage device.

DJ 801 may interact with server 808 at any time to create playlists 820 within DJ account 816. For example, DJ 801 may have a playlist 820(1) of favorite songs 812, and may have created playlist 820(2) with songs 812 selected specifically for venue 802. Songs 812 within playlists 820 are owned by DJ 801, and may be included within one or more playlists 820 based upon one or more parameters such as the venue for the performance, time of day of the performance, and other factors that affect the selection of music to be played. Playlists 820 typically contain more material than will be played by DJ 801 during the performance.

During the performance by DJ 801, system 800 may create actual playlist 820(3) based upon songs 812 (or portions thereof) selected during the performance. Additional metadata as to cue points, repeats, loops, within each song may also be recorded by system 800 thereby facilitating editing of mix 822 after the performance. Optionally, actual playlist 820(3) and/or mix 822 are initially recorded by computer 840 and later uploaded to system 800.

Enhanced Music Library Apps—and Playlists

Figure 9:
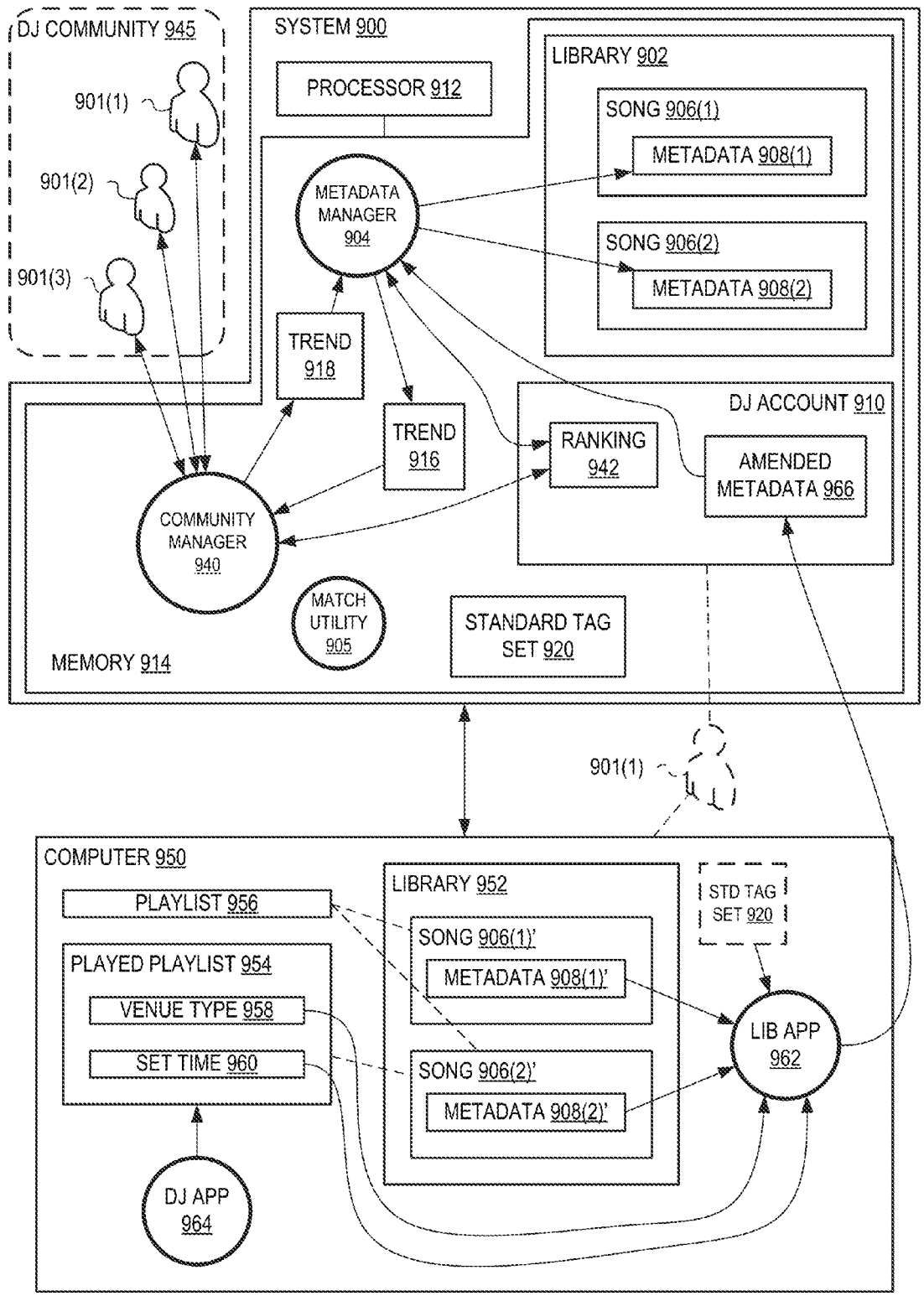
FIG. 9 shows one exemplary system for automatically managing metadata of audio files stored within a library, in an embodiment.
Figure 10:
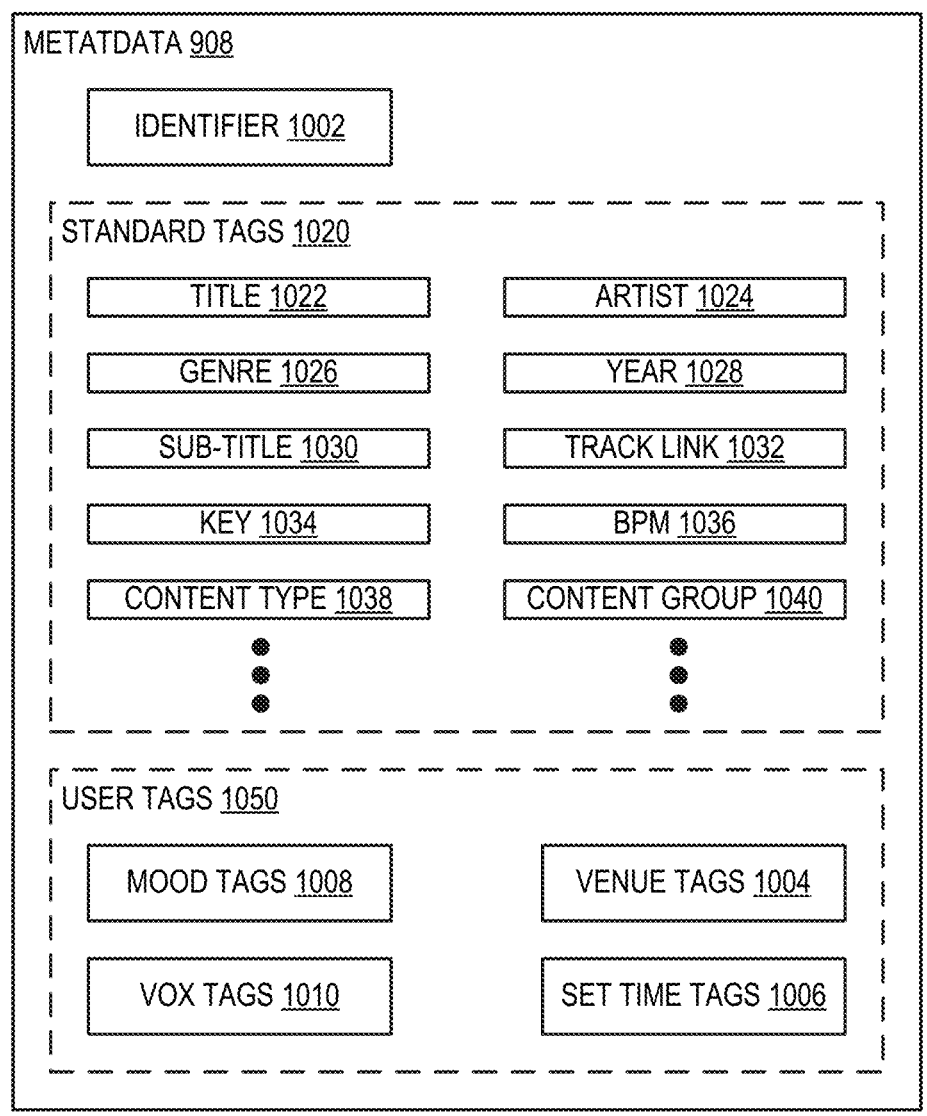
FIG. 10 shows exemplary data stored within the metadata of FIG. 9, in an embodiment.

FIG. 9 shows one exemplary system 900 for automatically managing metadata 908 of songs 906 stored within a library 902. Songs 906 may represent one or more of songs 200, 812, and stems 202. FIG. 10 shows exemplary data stored within metadata 908 of FIG. 9. FIGS. 9 and 10 are best viewed together with the following description.

Metadata 908 includes a unique identifier 1002 that stores a unique value to identify the song within system 900. Metadata 908 is usually included at the front of song 906, but may be located elsewhere within song 906 without departing from the scope hereof.

Metadata 908 may include ID3 tags that are standard for song metadata and supported in software such as iTunes, Windows Media Player, Winamp, YME, MusicMatch and hardware players like the iPod, Creative Zen, Toshiba Gigabeat and Sony Walkman. Metadata 908 for example includes information such as Title, Artist, Year, Genre and other information associated with song 906. Metadata 908 includes a unique identifier 1002 that stores a unique value to identify the song within system 900.

In one embodiment, as shown in FIG. 10, metadata 908 includes standard tags 1020 that are defined within the ID3 structure standard of www.id3.org. ID3 defines a standard for storing metadata tags within an audio file (e.g., song 906) and defines predefined standard tags 1020 within a frame structure that also allows non-standard tag types to be added without compromising the playability of the audio file on existing players. For example, ID3 predefined frames include: Album/Movie/Show title 1022, BPM (beats per minute) 136, Composer, Content type, Copyright message, Date of recording, Playlist delay, Encoded by, Lyricist/Text writer, File type, Time of recording, Content group description, Title/songname/content description, Subtitle/Description refinement, Initial key, Language(s) used in the audio, Length, Media type of audio original, Original album/movie/show title, Original filename, Original lyricist(s)/text writer(s), Original artist(s)/performer(s), Original release year, File owner/licensee, Lead performer(s)/Soloist(s), Band/orchestra/accompaniment, Conductor/performer refinement, Interpreted, remixed, or otherwise modified by, Part of a set, Publisher, Song number/Position in set, Recording dates, Internet radio station name, Internet radio station owner, Size, ISRC (international standard recording code), Software/Hardware and settings used for encoding, Year of the recording, and various URL link Frames.

Although many tag types are included within standard tags 1020, the genre tag type 1026, only stores one of a predefined set tag values. While this may be sufficient to help selection of music for individual listening, this single genre tag is not specific enough to select songs for DJing. Therefore, metadata 908 also includes mood tags 1008, venue tags 1004, set time tags 1006, and vox tags 1010, each of which may contain zero or more tag words that categorize song 906.

System 900 automatically maintains metadata 908 for each song 906. For example, where metadata 908 has tags that characterize the associated song 906, as agreed upon by a DJ community 945 (i.e., a community of DJs), selection of songs for a particular performance at a particular venue is simplified, as DJs 901 may search metadata 908 to identify songs 906 that match characteristics of the venue, performance time, expected cliental, desired audio content, and so on.

System 900 is for example a computer server and is shown with a processor 912 in communication with a memory 914. Memory 914 may represent one or both of volatile memory (e.g., SRAM, DRAM, or any combination thereof) and non-volatile memory (e.g., FLASH, ROM, magnetic media, optical media, or any combination thereof). In one embodiment, system 900 represents a plurality of interconnected (e.g., networked using one or both of LAN, WAN) computer servers that each contain one or more processors and wherein memory 914 is distributed therebetween. Memory 914 may also represent, at least in part, one or more network storage devices.

A library 902, stored within memory 914, contains a plurality of songs 906 that each has associated metadata 908. For example, song 906(1) has associated metadata 908(1), and song 906(2) has associated metadata 908(2). Although metadata 908 is shown within its associated song 906, metadata 908 may be stored elsewhere, such as within a database, without departing from the scope hereof. In one embodiment, system 900 represents an online audio media store, wherein songs 906 may be previewed and/or purchased by DJ 901(1) using a computer 950. Computer 950 is for example a portable computer such as one of a notebook computer and a laptop computer.

In the example of FIG. 9, DJ 901(1) has an account 910 with system 900, used for example to purchase a copy of songs 906, which are stored within a library 952 on computer 950 (shown as songs 906'). For example, song 906(1)' is a copy of song 906(1) and song 906(2)' is a copy of song 906(2). When copies of songs 906 are purchased, metadata 908' is a copy of metadata 908; however, DJ 901(1) may thereafter modify metadata 908' to include tags that are considered by DJ 901(1) to better define characteristics of the audio within songs 906'. For example, DJ 901(1) may utilize library application 962 to add or modify mood tags (e.g., Acid, Chill, Deep, Dark, Driving, Funky, Groovy, etc.) to metadata 908(1)' because DJ 901(1) believes that these tags better define the audio content of song 906(1)' and thereby allow DJ 901(1) to more easily find these songs 906' in the future. Similarly, DJ 901(1) may utilize and/or define Vox tags based upon recognized words that define the type of vocals in the song. (e.g., VOX Male, VOX Female, VOX, Vocode, Sample Male, Sample Female, Sample, Vocode, and None). In one example of operation, DJ 901(1) enhances metadata 908' as songs 906' are purchased and evaluated, and/or enhances metadata 908' as songs 906' are identified for use.

When performing at a venue, DJ 901(1) uses a DJ application 964 running on computer 950 to select and mix sounds of songs 906' in real-time during the performance. As DJ 901(1) plays at least a part of each song 906', DJ application 964 creates a played playlist 954 that identifies these songs 906' played during the performance. DJ 901(1) may also create a playlist 956 that identifies songs 906 that are favorites of DJ 901(1) and are suitable for playing during the performance. DJ 901(1) may create other playlists as described below.

For a performance at a venue, DJ 901(1) may define characteristics of the venue, illustratively shown as venue type 958 within played playlist 954, and a time of the performance, illustratively shown as set time 960 within played playlist 954. Venue type 958 may be based upon a predefined set of tags (e.g., Arena, Warehouse, Festival, Club, SideRoom, House, Pool, etc.) that may be used to describe the type of venue. In one embodiment, DJ 901(1) uses a word or phrase that is not in a predefined list, but is something that DJ 901(1) believes better describes the venue. That is, library application 962 allows DJ 901(1) to define a new tag value for use with venue type 958. Similarly, DJ 901(1) defines set time 960 to further characterize the performance based on one or more predefined tags (e.g., Intro, Opener, Filler, Peak, Closer, Afterhours, Sunrise, etc.) that further help characterize the type of song 906 selected for play during the performance. Where an appropriate tag value is not available, DJ 901(1) may use a non-standard tag value with set time 960.

Use of playlists is enhanced by allowing DJs 901 to select, from a vast library of many thousands of songs, songs to add to a playlist of songs that he is likely to play at a particular venue.

Within library 952, DJ 901(1) modifies metadata 908' to enhance searching for songs 906'. DJ 901(1) thereby builds relationships between, and defines characteristics of, songs 906'. For example, where DJ 901(1) purchases one or more stems for a precious purchased song, metadata 908' of each stem may be marked as being associated with the song. Similarly, loops and samples may have defined relationships with one or more songs and mixes.

Modification to metadata 908' by DJ 901(1) is made only within library 952 of computer 950. However, library application 962 may periodically process metadata 908' within library 952 to identify and send amendments, illustratively shown as amended metadata 966, to system 900, where it is stored within DJ account 910 for example.

Song Identification

Within library 902, each song 906 includes, within metadata 908, a unique identifier 1002. Since metadata 908 is stored within song 906, each copy of that song also includes identifier 1002. Thus, songs purchased from library 902 of system 900 automatically include identifier 1002 within their associated metadata. For example, where DJ 901(1) purchased song 906(1)', stored within library 952, from system 900, identifier 1002 facilitates matching of song 906(1)' with song 906 within library 902. Where a song (e.g., song 906(2)') is obtained from an alternative source (e.g., purchased from an alternate supplier, ripped from a CD, etc.) the metadata (e.g., metadata 908') may not contain identifier 1002. Further, the filename of the song may not match the filename of an equivalent file within library 902. Where a song within library 952 does not include identifier 1002, statistics and other information collected by library application 962, based upon usage of that song by the DJ for example, cannot be utilized by system 900 since the matching song within library 902 cannot be easily identified. Where the song 906' cannot be matched to a song within library 902, metadata manager 904 invokes a match utility 905 to find the matching song 906, within library 902, based upon contents and other information of song 906'.

For example, to match song 906(2)' from library 952 to a song within library 902, match utility 905 first searches for identifier 1002 within metadata 908(2)'. If found, identifier 1002 is used to identify song 906(2). If identifier 1002 is not found, match utility 905 then searches for the filename of song 906(2)' within library 902. Where a matching filename is found within library 902, match utility 905 may then use other comparisons to verify that song 906(2) does match song 906(2)'. For example, match utility 905 may review a stored purchase history of DJ account 910 to verify that DJ 901(1) purchased that particular song. In another example, match utility 905 may use a 'fingerprint' technique to verify that the audio data within song 906(2)' matches the audio data within song 906(2), where for example the 'fingerprint' is based upon one or more of: a checksum of the audio data within the song, a hash function of the audio data, and an audio fingerprint of the audio data.

Once song 906(2)' is matched to song 906(2), song match utility 905 automatically inserts metadata (e.g., unique identifier 1002) retrieved from, or associated with, the matched song within library 902 into the song within library 952, thereby facilitating future matches.

Updating Metadata Based Upon Trend

Within library 952, DJ 901(1) may use library application 962 to modify metadata 908' of one or more songs 906' to facilitate better searching. System 900 includes a standard tag set 920 of tags (e.g., mood words) used within metadata 908. For example, library application 962 may allow DJ 901(1) to select one or more standard tags from standard tag set 920 for use within metadata 908'. Where DJ 901(1) finds standard tag set 920 limiting, DJ 901(1) may use tags (e.g., mood words) that are not included within standard tag set 920. That is, DJ 901(1) may create new tags by using alternative mood words within metadata 908'.

Library application 962 retrieves metadata 908' from library 952 and sends any amended metadata (illustratively shown as amended metadata 966) to system 900, where it is stored in association with DJ account 910. Metadata manager 904 processes amended metadata 966 from each DJ account within system 900 to determine a trend 916 of metadata amendments. In one embodiment, metadata manager 904 processes amended metadata 966 periodically (e.g., weekly) to identify trend 916 based upon statistical analysis of changes within metadata 966.

Trend 916 indicates metadata 908 amendments that are common among a plurality of DJs (e.g., DJ 901(1)) that have accounts (e.g., DJ account 910) with system 900. When determining trend 916, metadata manager 904 utilizes a ranking 942 of DJ 901(1) to weight amended metadata 966, wherein ranking 942 indicates a standing of DJ 901 relative to other DJs 901(2) and 901(3) within a DJ community 945. For example, a DJ having a higher ranking 942 would carry more weight that a DJ with a lower ranking. DJ community 945 is for example a community of professional DJs wherein each DJ is ranked based upon earnings and/or popularity. In one example, ranking 942 has a range of 1-10 where 1 represents a novice professional DJ and 10 represents a well-recognized professional DJ (e.g., a DJ guru).

In one embodiment, metadata manager 904 automatically adds a modified or new tag to standard tag set 920 when the tag receives sufficient popularity as defined by trend 916. In another embodiment, metadata manager 904 sends trend 916 to a community manager 940, wherein an opinion poll and/or survey of DJs 901 within DJ community 945 identifies which if any of the tags within amended metadata 966 is to be incorporated within standard tag set 920.

Similarly, trend 916 may also define popular amendments to metadata 908 (e.g., amendments to tags within one or more of songs 906 within library 902), and may also utilize ranking 942 of each DJ 901 to apply a weighting to amendments within amended metadata 966 to generate trend 916. In one embodiment, metadata manager 904 automatically implements modifications to metadata 908 based upon popularity of the modification defined within trend 916. In another embodiment, metadata manager 904 sends trend 916 to a community manager 940, wherein an opinion poll and/or survey of DJs 901 within DJ community 945 identifies which if any of metadata modifications is sent as trend 918 for incorporation within metadata 908.

Figure 11:
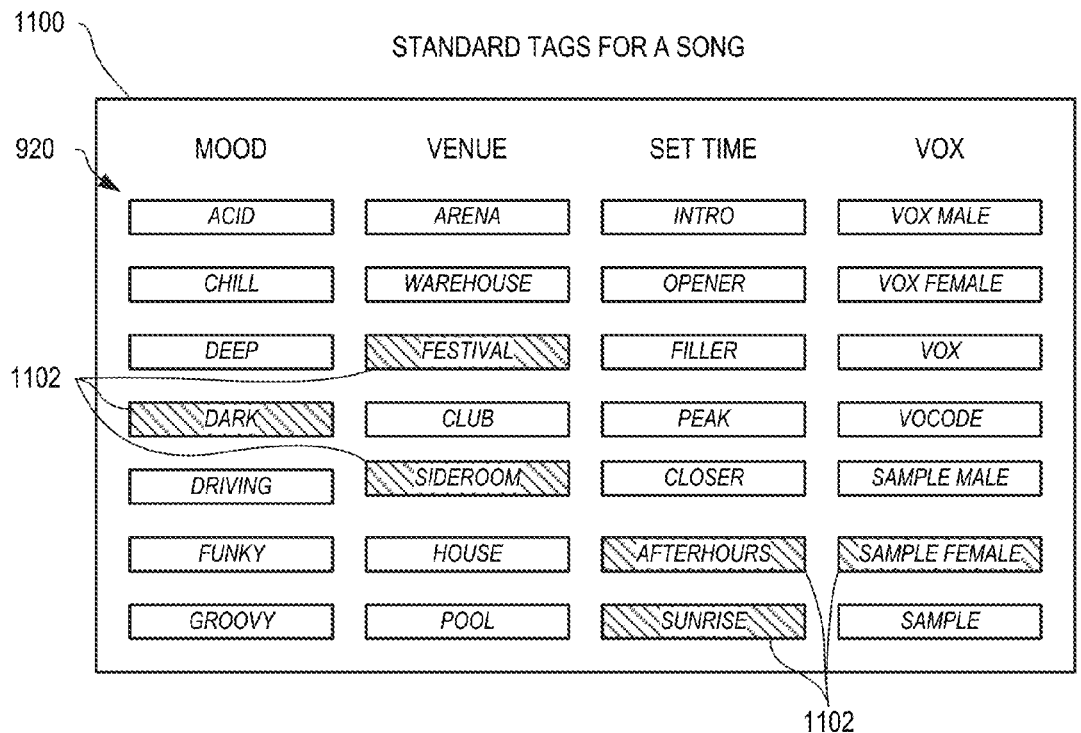
FIG. 11 shows one exemplary interactive tag selection window displaying tags of standard tag set and further indicates specific tags that are selected by the DJ community for a selected song, in an embodiment.

FIG. 11 shows one exemplary interactive tag selection window 1100 displaying tags of standard tag set 920 and further indicates specific tags 1102 (similarly shaded within FIG. 12) that are selected (i.e., defined) by the DJ community for a selected song (e.g., song 906' within library 952). Tag selection window 1100 is for example displayed by library application 962 on computer 950 to display, and to allow local modification of, tags for the selected song. Defined tags 1102 are for example displayed in a different style and/or color from undefined tags.

Figure 12:
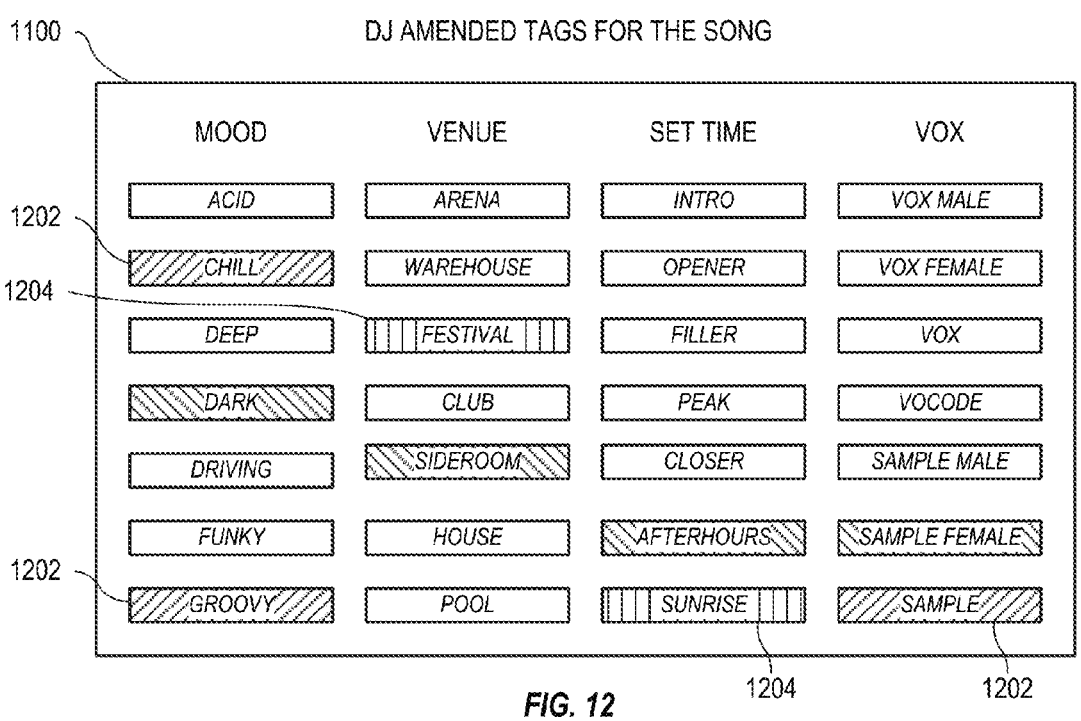
FIG. 12 shows the tag selection window of FIG. 11 after amendment by the DJ, in an embodiment.

FIG. 12 shows tag selection window 1100 after amendment by DJ 901. In particular, DJ 901 has added tags 1202 (similarly shaded) and has deselected tags 1204 (similarly shaded). Added tags 1202 are for example styled and/or colored differently from tags 1102 to indicate that they are not defined by the DJ community, and similarly deselected tags 1204 are styled and/or colored differently to indicate that they are deselected but defined by the DJ community for that song. Thus, tag selection window 1100 allows DJ 901 to easily see, for the selected song, which tags are defined by the DJ community and which tags are modified within the local library 952.

In one example of operation, based upon amendments made to tags within tag selection window 1100, library application 962 generates amended metadata 966 and sends amended metadata 966 to system 900, where it is stored within DJ account 910. As described above, newly added words and phrases may be incorporated into standard tag set 920 by metadata manager 904 if they become popular within DJ community 945.

Figure 13:
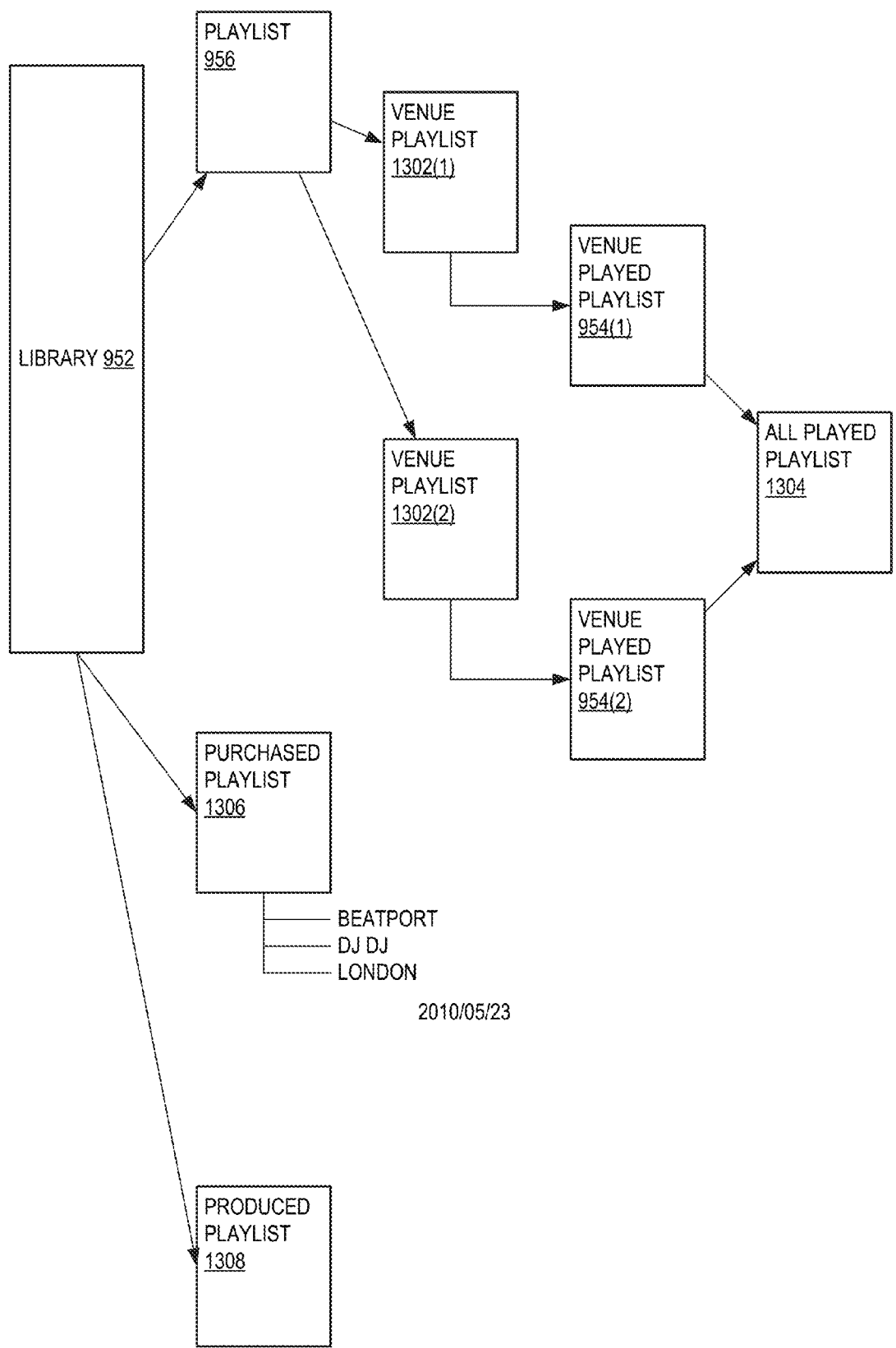
FIG. 13 shows exemplary playlists generated from the library of FIG. 9 by the library application, in an embodiment.

FIG. 13 shows exemplary playlists generated from library 952 of FIG. 9 by library application 962. As DJ 901(1) utilizes DJ application 964 and library application 962 to select and play songs 906, library application 962 maintains played playlist 954, playlist 956, venue playlists 1302, played playlists 954, all played playlist 1304, purchased playlist 1306, and produced playlist 1308.

Playlist 956 is created by DJ 901(1) to identify songs 906 that are of interest, such as favorite songs, frequently played songs, frequently requested songs, and so on. Playlist 956 identifies a sub-set of songs 906 within library 952, which may contain many thousands of songs. Playlist 956 thereby simplifies searching for songs of interest to DJ 901(1).

Prior to a performance at a first venue, DJ 901(1) may utilize library application 962 to create venue playlist 1302 (1) based upon conditions (e.g., venue type 958 and set time 960) and expectations of the audience at that venue. For example, DJ 901(1) may select appropriate songs 906 from playlist 956 to create venue playlist 1302(1) for the first venue. Similarly, in preparation for a performance at a second venue, DJ 901(1) may select songs 906 from playlist 956 to create venue playlist 1302(2) based upon the expected audience and conditions (e.g., venue type 958 and set time 960). In another example, DJ 901(1) uses library application 962 to copy venue playlist 1302(1) to form venue playlist 1302(2), and then modifies venue playlist 1302(2) based upon difference in conditioned between the first and the second venues.

DJ 901(1) may also select one or more songs 906 directly from library 952 (e.g., by searching) for inclusion within venue playlist 1302(1), wherein library application 962 automatically adds an identifier for that song to playlist 956 when that file is not already identified within playlist 956. That is, playlist 956 is automatically maintained by library application 962.

When performing at the first venue, DJ 901(1) may not play all songs identified within venue playlist 1302(1). However, DJ application 964 and/or library application 962 generates venue played playlist 954(1) to identify songs 906 played at that performance. Optionally, venue played playlist 954 may define the portion of each song played. Similarly, during the performance at the second venue, DJ application 964 and/or library application 962 generates venue played playlist 954(2) to identify songs 906 played at that performance. DJ application 964 and/or library application 962 also generates all played playlist 1304 to identify all songs 906 played by DJ 901(1). That is, venue played playlists 954 are each subsets of all played playlist 1304.

Library application 962 may also automatically maintain purchased playlist 1306 that identifies each song 906 purchased by DL 901(1). Optionally, purchased playlist 1306 also identifies from where the songs were purchased, and when they were purchased. Library application 962 may also maintain produced playlist 1308 that identifies songs 906 (e.g., mix 822 of FIG. 8) created by DJ 901(1).

System 900 may utilize information of playlists 954, 956, 1302, 1304, 1306 and 1308 to generate statistical information regarding songs 906. For example, system 900 may determine statistical information from venue played playlists 954 collected from a plurality of DJs to determine correlation and trends in songs played at different types of venue. System 900 may also collect information from purchased playlist 1306 to determine trends and popularity of newly purchased songs. As shown in FIG. 13, purchased playlist 1306 may also include information such as where each song was purchased, and when the song was purchased.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. In particular, the following embodiments are specifically contemplated, as well as any combinations of such embodiments that are compatible with one another:

A. A system for selectively mixing a first song and a second song together during a live performance, wherein the first song comprises a plurality of first stems each having stereo audio and that combine to form the audio of the first song, and wherein the second song comprises a plurality of second stems each having stereo audio and that combine to form the audio of the second song, the system comprising: a computer having memory and a processor; a multiple channel audio mixing application, comprising machine readable instructions stored within the memory and executed by the processor, for playing and mixing audio of at least one of the first stems with audio of at least one of the second stems; wherein the multiple channel audio mixing application is controlled in real-time during the performance to select the at least one first stem and the at least one second stem for the mixing.

B. The system of embodiment A, further comprising a DJ console coupled to an interface of the computer and comprising a plurality of controls for controlling the multiple channel audio mixing application during the performance to select and mix the at least one first stem and the at least one second stem together.

C. The system of embodiment A or B, the multiple channel audio mixing application further comprising machine readable instructions stored within the memory and executed by the processor for: interacting with the DJ prior to the performance to (a) define at least one first cue point within each of the first stems, and (b) define at least one second cue point within one or more of the second stems; and interacting in real-time with the DJ during the performance to select one or more of the first and second cue points to initiate play of the corresponding stem at the corresponding cue point.

D. The system of embodiments A through C, wherein the at least one first cue point defines a playback point within each of the first songs.

E. The system of embodiments A through D, wherein the at least one first cue point and the at least one second cue point are at different playback positions within the first and second songs.

F. A method for selectively mixing a first song and a second song together during a live performance by a DJ, wherein the first song comprises a plurality of first stems that each comprises audio that combines to form the audio of the first song, and wherein the second song comprises a plurality of second stems that each comprises audio that combine to form the audio of the second song, comprising: interacting with the DJ using a DJ console having a plurality of physical controls coupled to a computer to receive instructions during the performance; selecting within the computer, based upon the instructions, at least one of the first stems and at least one of the second stems; and mixing within the computer, based upon the instructions, the at least one first stem and the at least one second stem to generate an audio output for the live performance.

G. The method of embodiment F, further comprising interacting with the DJ prior to the performance to (a) define at least one first cue point within each of the first stems, and (b) define at least one second cue point within one or more of the second stems.

H. The method of embodiment F or G, further comprising interacting in real-time with the DJ during the performance to select one or more of the at least one first and second cue points to initiate play of the corresponding stem at the corresponding cue point.

I. The method of embodiment F through H, wherein the at least one first cue point and the at least one second cue point are synchronized with the audio output for the live performance.

J. A console for providing a DJ control of DJ mixing software to mix one or more stems of each of two or more songs together in real time, comprising: a housing having a faceplate and a communication port; a first set of stem controls for controlling play of a first stem of a first song by the DJ mixing software; a second set of stem controls for controlling play of a second stem of the first song by the DJ mixing software; a third set of stem controls for controlling play of a third stem of a second song by the DJ mixing software; and a fourth set of stem controls for controlling play of a fourth stem of the second song by the DJ mixing software; wherein the DJ mixing software is controlled by the first, second, third, and fourth stem controls to mix at least one of the first stem and the second stem and at least one of the third stem and the fourth stem together in real time to generate an audio output.

K. The console of embodiment J, wherein the first and second sets of controls form a first deck for controlling play of the first song.

L. The console of embodiment J or K, wherein the third and fourth sets of control form a second deck for controlling play of the second song.

M. A system for cloud-based DJing during a live performance, comprising: a server computer, located within the cloud and accessible via the Internet, comprising a processor and a memory for storing a plurality of songs; an account manager, implemented as machine readable instructions stored within the memory that when executed by the processor, interact with a DJ computer via the Internet to identify a first and a second song; and a stream buffer for receiving the first and second songs from the memory and for streaming the first and second songs to the DJ computer; wherein the DJ computer mixes the first and second songs during the live performance.

N. The system of embodiment M, wherein the first and second songs are streamed simultaneously to the DJ computer.

O. A method for DJing from the cloud, comprising: interacting with a DJ computer via the Internet to identify a first and a second song; retrieving the first and second songs from a library of songs; streaming the first and second song, via the Internet, to the DJ computer; wherein the DJ computer mixes at least part of the first song and at least part of the second song together to generate sounds for a live performance.

P. The method of embodiment O, wherein the step of streaming comprises streaming the first and second song simultaneously to the DJ computer.

Q. A system for automatically updating metadata for a song, comprising: a computer server having a processor, non-transitory memory, and an interface to the Internet; a song library, stored within the memory, containing the song and metadata associated with the song; a metadata manager comprising machine readable instructions stored within the memory and executed by the processor to automatically update metadata for the song by: receiving amended metadata for the song from each of a plurality of DJ libraries remotely stored from the computer server; collectively processing the amended metadata to algorithmically determine a trend in the amendments; and applying the amendments to the metadata associated with the song within the song library based upon the trend.

R. The system of embodiment Q, further comprising a community manager having machine readable instructions stored within the memory and executed by the processor for interacting with each DJ of a DJ community to determine a ranking of the DJ within the DJ community.

S. The system of embodiment Q or R, the metadata manager further comprising machine readable instructions executed by the processor for applying a weighting to the amended metadata of each DJ based upon the ranking to determine the trend.

T. The system of embodiments Q through S, the metadata manager further comprising machine readable instructions executed by the processor for determining approval of the amendments by the DJ community based upon one or both of an opinion poll and a survey.

U. The system of embodiments Q through T, wherein the metadata manager receives the amended metadata from a library application operating within each of a plurality of computers storing one of the DJ libraries, wherein the library application operates to (a) automatically determine the amended metadata with the DJ library, and (b) send the amended metadata to the metadata manager.

V. A method for automatically updating metadata of a song stored in a song library of a computer server, comprising: receiving, within the computer server, amended metadata for the song from each of a plurality of remote DJ libraries, each maintained by a different DJ; collectively processing the amended metadata to determine a trend in the amendments based upon statistical analysis; and applying the amendments to the metadata of the song within the song library based upon the trend.

W. The method of embodiment V, further comprising interacting from the computer server with each DJ of a DJ community to determine a ranking of the DJ within the DJ community.

X. The method of embodiment V or W, further comprising applying a weighting to the amended metadata of each DJ based upon the ranking to determine the trend.

Y. The method of embodiments V through X, further comprising determining approval of the amendments by the DJ community based upon one or both of an opinion poll and a survey.

Z. The method of embodiments V through Y, wherein the amended metadata is received from a library application operating within a DJ computer to (a) automatically determine the amended metadata, and (b) send amended metadata to the server computer.

AA. The method of embodiments V through Z, wherein the metadata comprises a venue indicative of a location suitable for playing the song.

BB. The method of embodiments V through AA, wherein the metadata comprises a set time indicative of a time suitable for performing the song.

CC. The method of embodiments V through BB, wherein the metadata comprises a set of mood tags indicative of the song content.

DD. A method for automatically managing and organizing songs, comprising:
detecting, on a computer of a DJ, a purchase of a song; automatically adding information of the purchase and of the song to a purchased playlist of the computer; detecting, within a DJ application running on the computer, when the DJ plays at least a part of the song during a performance at a venue; and automatically adding information of the song to a venue played playlist stored on the computer, wherein the venue played playlist is associated with the venue.

EE. The method of embodiment DD, further comprising automatically adding information of the song to an all played playlist stored on the computer.

FF. The method of embodiment DD or EE, wherein the purchased playlist and the venue played playlist are sent to a server computer for statistical analysis.

GG. A method for automatically managing and organizing songs, comprising: receiving, within a computer server, purchase information based upon a purchased playlist stored on a remote computer of a DJ, wherein the purchased playlist is automatically generated on the remote computer when a song is purchased; receiving, within the computer server, venue information based upon a venue played playlist stored on the remote computer, wherein the venue played playlist is automatically generated within the remote computer when the DJ plays at least part of the song at a venue; and determining, within the computer server, statistical information indicative of song popularity from the purchase information and the venue played playlist.

HH. The method of embodiment GG, further comprising: receiving, within the computer server, played information based upon an all played playlist stored on the remote computer, wherein the all played playlist is automatically generated when the DJ plays at least part of the song; wherein the statistical information is also based upon the played information.

What is claimed is:

1. A system for selectively mixing a first song and a second song together during a live performance, wherein the first song comprises a plurality of first stems each having stereo audio and that combine to form the audio of the first song, and wherein the second song comprises a plurality of second stems each having stereo audio and that combine to form the audio of the second song, the system comprising:
a computer having memory and a processor;
a multiple channel audio mixing application, comprising machine readable instructions stored within the memory and executed by the processor, for playing and mixing audio of one of the first stems with audio of one of the second stems;
wherein the multiple channel audio mixing application is controlled in real-time during the performance to select the one first stem and the one second stem for the mixing.

2. The system of claim 1, further comprising a Disk-Jockey (DJ) console coupled to an interface of the computer and comprising a plurality of controls for controlling the multiple channel audio mixing application during the performance to select and mix the one first stem and the one second stem together.

3. The system of claim 1, the multiple channel audio mixing application further comprising machine readable instructions stored within the memory and executed by the processor for:
interacting with a Disk-Jockey (DJ) prior to the performance to (a) define at least one first cue point within each of the first stems, and (b) define at least one second cue point within one or more of the second stems; and
interacting in real-time with the DJ during the performance to select one or more of the first and second cue points to initiate play of the corresponding stem at the corresponding cue point.

4. The system of claim 3, wherein the at least one first cue point defines a playback point within each of the first songs.

5. The system of claim 3, wherein the at least one first cue point and the at least one second cue point are at different playback positions within the first and second songs.

6. A method for selectively mixing a first song and a second song together during a live performance by a Disk-Jockey (DJ) wherein the first song comprises a plurality of first stems that each comprises audio that combines to form the audio of the first song, and wherein the second song comprises a plurality of second stems that each comprises audio that combine to form the audio of the second song, comprising:

interacting with the DJ using a DJ console having a plurality of physical controls coupled to a computer to receive instructions during the performance;

selecting within the computer, based upon the instructions, one of the first stems and one of the second stems; and mixing within the computer, based upon the instructions, the one first stem and the one second stem to generate an audio output for the live performance.

7. The method of claim 6, further comprising interacting with the DJ prior to the performance to (a) define at least one first cue point within each of the first stems, and (b) define at least one second cue point within one or more of the second stems.

8. The method of claim 7, further comprising interacting in real-time with the DJ during the performance to select one or more of the at least one first and second cue points to initiate play of the corresponding stem at the corresponding cue point.

9. The method of claim 7, wherein the at least one first cue point and the at least one second cue point are synchronized with the audio output for the live performance.

10. A console for providing a Disk-Jockey (DJ) control of DJ mixing software to mix one or more stems of each of two or more songs together in real time, comprising:

a housing having a faceplate and a communication port;

a first set of stem controls for controlling play of a first stem of a first song by the DJ mixing software;

a second set of stem controls for controlling play of a second stem of the first song by the DJ mixing software;

a third set of stem controls for controlling play of a third stem of a second song by the DJ mixing software; and a fourth set of stem controls for controlling play of a fourth stem of the second song by the DJ mixing software;

wherein the DJ mixing software is controlled by the first, second, third, and fourth stem controls to mix at least one of the first stem and the second stem and at least one of the third stem and the fourth stem together in real time to generate an audio output.

11. The console of claim 10, wherein the first and second sets of controls form a first deck for controlling play of the first song.

12. The console of claim 10, wherein the third and fourth sets of control form a second deck for controlling play of the second song.

\* \* \* \* \*